(12) United States Patent
Joo et al.

(10) Patent No.: US 9,778,733 B2
(45) Date of Patent: Oct. 3, 2017

(54) METHOD OF SETTING PRINTING OPTION THROUGH TOUCH INPUT AND MOBILE DEVICE TO PERFORM SAME

(71) Applicant: Samsung Electronics Co., Ltd, Suwon-si, Gyeonggi-do (KR)

(72) Inventors: Jin-myung Joo, Seoul (KR); Tae-hyun Kim, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 63 days.

(21) Appl. No.: 14/301,502

(22) Filed: Jun. 11, 2014

(65) Prior Publication Data
US 2015/0055171 A1    Feb. 26, 2015

(30) Foreign Application Priority Data
Aug. 20, 2013 (KR) .................. 10-2013-0098610

(51) Int. Cl.
*G06F 3/00* (2006.01)

(52) U.S. Cl.
CPC ..................................... *G06F 3/00* (2013.01)

(58) Field of Classification Search
None
See application file for complete search history.

(56) References Cited

U.S. PATENT DOCUMENTS

| | | | |
|---|---|---|---|
| 2003/0103234 A1* | 6/2003 | Takabayashi et al. ....... | 358/1.15 |
| 2003/0107767 A1* | 6/2003 | Ishizaki ....................... | 358/1.18 |
| 2003/0137691 A1* | 7/2003 | Tanaka ........................ | 358/1.15 |
| 2003/0147097 A1* | 8/2003 | Kotani .................. | G06K 15/00 358/1.18 |
| 2003/0231345 A1* | 12/2003 | Azami ........................ | 358/1.18 |
| 2005/0002063 A1* | 1/2005 | Hanamoto ............ | G06K 15/00 358/1.18 |
| 2005/0168779 A1* | 8/2005 | Tsue et al. .................... | 358/1.18 |
| 2007/0064288 A1* | 3/2007 | Lee ............................... | 358/527 |
| 2007/0182973 A1* | 8/2007 | Godley ........................ | 358/1.6 |
| 2008/0225346 A1* | 9/2008 | Mano et al. .................. | 358/448 |
| 2010/0073692 A1* | 3/2010 | Waltman .............. | G06F 17/212 358/1.1 |
| 2010/0172631 A1* | 7/2010 | Nagasawa et al. ............ | 386/95 |
| 2010/0251167 A1* | 9/2010 | DeLuca et al. ............... | 715/786 |
| 2011/0209080 A1* | 8/2011 | Bamford et al. ............. | 715/769 |
| 2011/0279392 A1* | 11/2011 | Yamaguchi et al. .......... | 345/173 |
| 2011/0302490 A1* | 12/2011 | Koarai ......................... | 715/274 |
| 2012/0019863 A1* | 1/2012 | Sensu et al. .................. | 358/1.15 |
| 2012/0086652 A1* | 4/2012 | Kim et al. .................... | 345/173 |
| 2012/0206498 A1* | 8/2012 | Kai et al. ..................... | 345/684 |
| 2013/0169976 A1* | 7/2013 | Yamada ........................ | 358/1.2 |
| 2013/0169981 A1* | 7/2013 | Takahashi .................... | 358/1.9 |
| 2014/0092426 A1* | 4/2014 | Fujishita .............. | G06K 15/005 358/1.15 |

FOREIGN PATENT DOCUMENTS

JP    2013-054508    3/2013

* cited by examiner

*Primary Examiner* — Ming Hon
(74) *Attorney, Agent, or Firm* — Staas & Halsey LLP

(57) ABSTRACT

A method of setting a printing option through a touch input includes displaying a preview, which includes a virtual sheet of paper and thumbnails corresponding to content to be printed, on a touch screen of a mobile device, determining a printing option by receiving and analyzing a touch input on the virtual sheet of paper and the thumbnails, and applying the determined printing option to the preview.

24 Claims, 16 Drawing Sheets

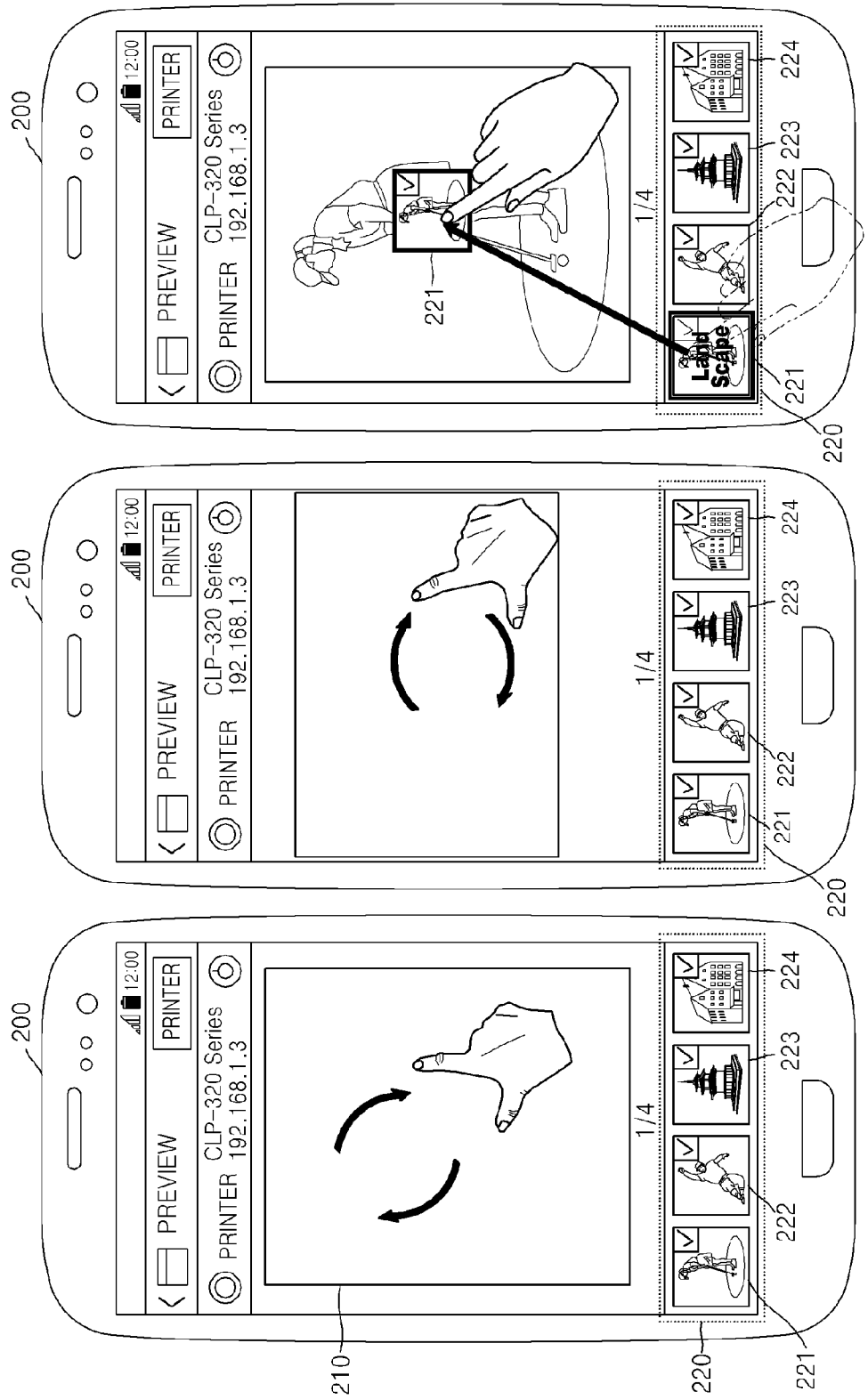

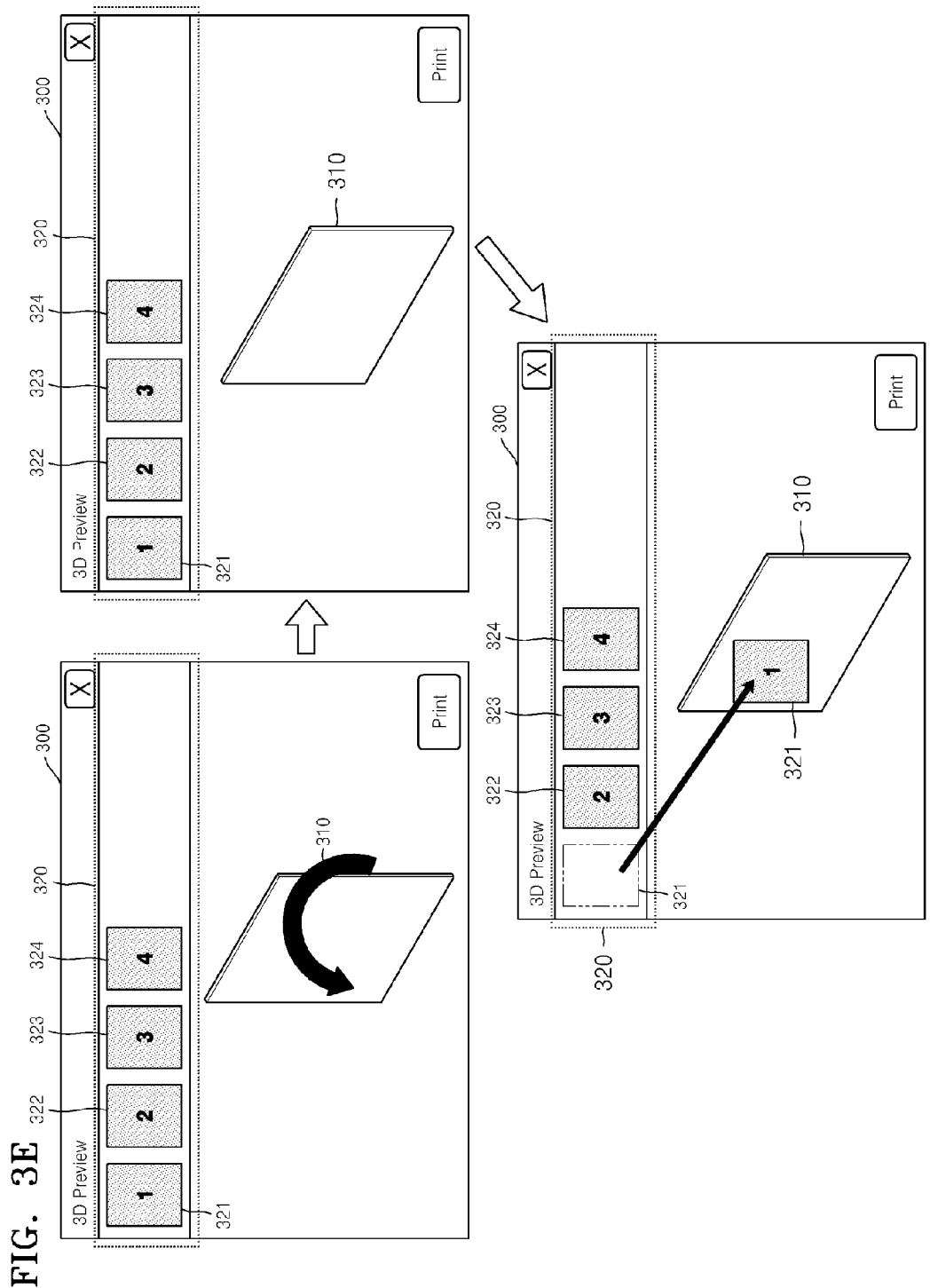

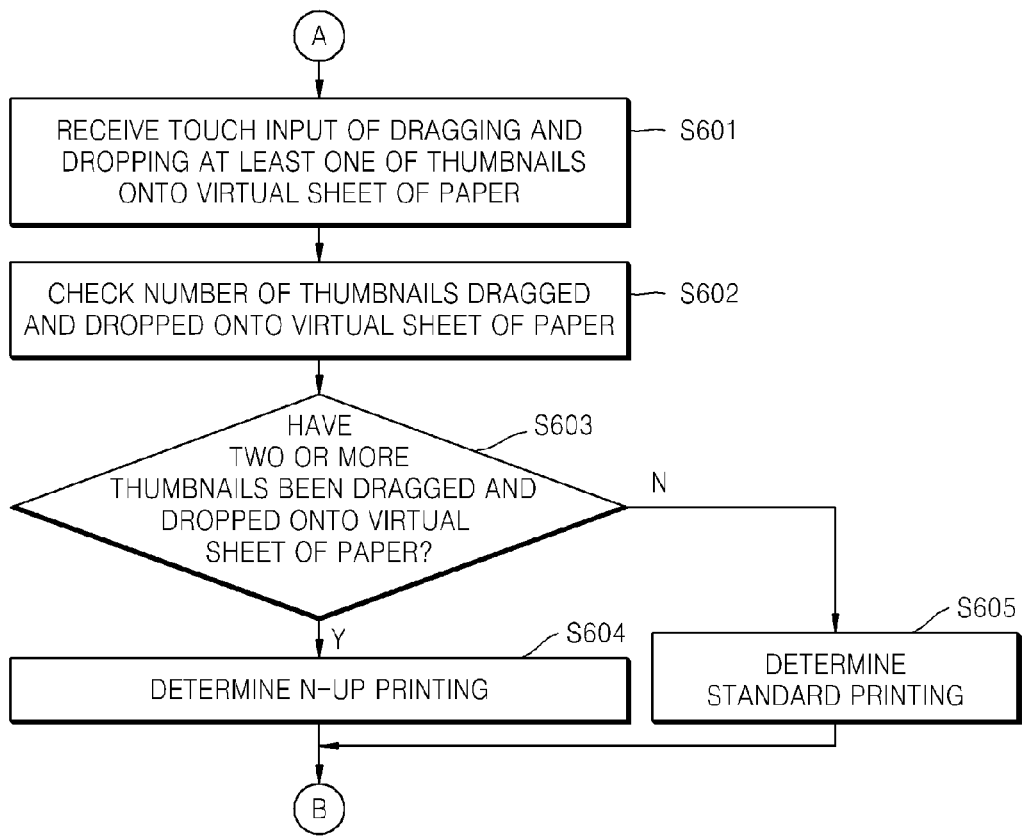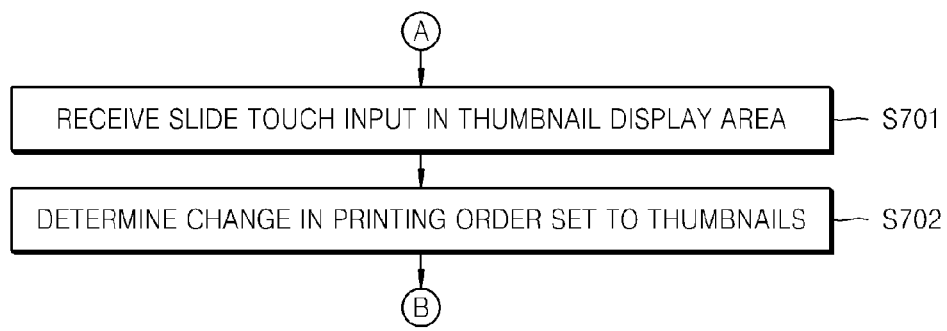

METHOD OF SETTING PRINTING OPTION THROUGH TOUCH INPUT AND MOBILE DEVICE TO PERFORM SAME

CROSS-REFERENCE TO RELATED APPLICATIONS

This application claims priority under 35 U.S.C. §119 from Korean Patent Application No. 10-2013-0098610, filed on Aug. 20, 2013, in the Korean Intellectual Property Office, the disclosure of which is incorporated herein in its entirety by reference.

BACKGROUND OF THE INVENTION

1. Field of the Invention

One or more exemplary embodiments of the present general inventive concept relate to a method of setting a printing option through a touch input and a mobile device to perform the same.

2. Description of the Related Art

Along the development of mobile communication technology and the popularization of mobile communication devices, mobile devices, such as smart phones, tablet personal computers (PCs), personal digital assistants (PDAs), and the like, have replaced the roles of existing PCs. Accordingly, a mobile-based printing environment, such as cloud printing, has been gradually spread and developed.

Cloud printing refers to technology of directly printing in a printer connected over a network when a mobile device, such as a cellular phone or a tablet PC, requests the printing. In a cloud printing environment, a mobile device, a printer, and a cloud server are connected to each other over a wireless network and transmit and receive information related to printing therebetween.

To perform the mobile-based printing, options required for direct printing may be set in a mobile device. However, since mobile devices generally have a relatively small screen on which a touch using a finger is input, it may be inconvenient to set various printing options through the small screen.

SUMMARY OF THE INVENTION

One or more exemplary embodiments of the present general inventive concept include a method of easily and intuitively setting a printing option based on a touch-based interface and a mobile device to perform the same.

Additional features and utilities of the present general inventive concept will be set forth in part in the description which follows and, in part, will be apparent from the description, or may be learned by practice of the general inventive concept.

Exemplary embodiments of the present general inventive concept provide a method of setting a printing option through a touch input, the method including displaying a preview, which includes a virtual sheet of paper and thumbnails corresponding to content to be printed, on a touch screen of a mobile device, determining a printing option by receiving and analyzing a touch input on the virtual sheet of paper and the thumbnails, and applying the determined printing option to the preview.

The determining the printing option may include receiving a touch input of dragging and dropping at least one of the thumbnails onto the virtual sheet of paper, checking the number of thumbnails dragged and dropped on the virtual sheet of paper, and determining N-up printing if the checked number of thumbnails is greater than one.

The determining the printing option may include receiving a slide touch input in a region in which the thumbnails are displayed on the preview, and determining a change in a printing order set for the thumbnails.

The determining the printing option may include receiving a touch input of dragging and dropping at least one of the thumbnails onto the virtual sheet of paper, receiving a touch input of horizontally or vertically sliding on the virtual sheet of paper, displaying a rear surface of the virtual sheet of paper on the preview, receiving a touch input of dragging and dropping at least one of the thumbnails onto the rear surface of the virtual sheet of paper, and determining duplex printing.

The determining the printing option may include receiving a touch input of rotating on the virtual sheet of paper, rotating an orientation of the virtual sheet of paper according to the touch input of rotating and displaying the virtual sheet of paper on the preview screen according to the rotated orientation, receiving a touch input of dragging and dropping at least one of the thumbnails onto the rotated virtual sheet of paper, and determining a printing direction change.

The determining the printing option may include receiving an input for one or more additional virtual sheets of paper, displaying a corresponding plurality of virtual sheets of paper on the preview screen, receiving a touch input of dragging and dropping at least one of the thumbnails onto each of the plurality of virtual sheets of paper, and setting a printing order according to an order of the plurality of virtual sheets of paper.

The applying the determined print option may include displaying content corresponding to a selected one of the thumbnails on the virtual sheet of paper according to the determined printing option.

The applying the determined print option may include displaying a mask image indicating the determined print option on the selected thumbnail.

During the preview, the virtual sheet of paper may be displayed as a three-dimensional (3D) view.

A non-transitory computer-readable medium may contain computer-readable codes as a program to execute the method of setting the printing option.

Exemplary embodiments of the present general inventive concept also provide a mobile device including a user interface unit to receive a touch input from a user, a preview providing unit to provide a preview, which includes a virtual sheet of paper and thumbnails corresponding to content to be printed, to the user interface unit so that the preview is displayed on the user interface unit, a printing option management unit to manage setting a printing option through a touch input on the virtual sheet of paper and the thumbnails, and a control unit to control the user interface unit, the preview providing unit, and the printing option management unit.

The printing option management unit may include a printing option determining unit to determine a printing option by analyzing a touch input on the virtual sheet of paper and the thumbnails, and a printing option applying unit to apply the determined printing option to the preview.

If a touch input of dragging and dropping at least one of the thumbnails onto the virtual sheet of paper is received through the user interface unit, the printing option determining unit may check the number of thumbnails dragged and dropped on the virtual sheet of paper and determine N-up printing if the checked number of thumbnails is greater than one.

If a slide touch input in a region in which the thumbnails are displayed on the preview screen is received through the user interface unit, the printing option determining unit may determine a change in a printing order set for the thumbnails.

If a touch input of horizontally or vertically sliding on the virtual sheet of paper is received through the user interface unit after receiving a touch input of dragging and dropping at least one of the thumbnails onto the virtual sheet of paper, the preview providing unit may display a rear surface of the virtual sheet of paper on the preview, and if a touch input of dragging and dropping at least one of the thumbnails onto the rear surface of the virtual sheet of paper is received, the printing option determining unit may determine duplex printing.

If a touch input of rotating on the virtual sheet of paper is received through the user interface unit, the preview providing unit may rotate an orientation of the virtual sheet of paper according to the touch input of rotating and display the virtual sheet of paper on the preview screen according to the rotated orientation, and if a touch input of dragging and dropping at least one of the thumbnails onto the virtual sheet of paper having the rotated orientation is received, the printing option determining unit may determine a printing direction change.

If an input for one or more additional virtual sheets of paper is received through the user interface unit, the preview providing unit may display a corresponding plurality of virtual sheets of paper on the preview screen, and if a touch input of dragging and dropping at least one of the thumbnails onto each of the plurality virtual sheets of paper is received, the printing option determining unit may set a printing order according to an order of the plurality of virtual sheets of paper.

The preview providing unit may display content corresponding to a selected one of the thumbnails on the virtual sheet of paper according to the printing option determined by the printing option determining unit.

The preview providing unit may display a mask image indicating the printing option determined by the printing option determining unit on the selected thumbnail.

The preview providing unit may display the virtual sheet of paper as a three-dimensional (3D) view.

Exemplary embodiments of the present general inventive concept also provide a method of displaying content on a mobile device, the method including displaying a virtual sheet of paper and at least one thumbnail on a touch screen of the mobile device, and displaying content corresponding to the at least one thumbnail by arranging the content corresponding to the at least one thumbnail on the virtual sheet of paper according to a touch input on the virtual sheet of paper and the at least one thumbnail.

The method may further include obtaining a printing option according to the arrangement of the content on the virtual sheet of paper.

The method may further include transmitting the content to an external device.

The method may further include displaying a plurality of thumbnails on a region of the touch screen, and changing a printing order of content corresponding to the plurality of thumbnails according to another touch input on the region of the touch screen where the plurality of thumbnails are displayed.

Exemplary embodiments of the present general inventive concept also provide a mobile device including a touch screen to display a virtual sheet of paper and at least one thumbnail, and a control unit to control the touch screen to display content corresponding to the at least one thumbnail by arranging the content on the virtual sheet of paper according to a touch input on the virtual sheet of paper and the at least one thumbnail.

BRIEF DESCRIPTION OF THE DRAWINGS

These and/or other features and utilities of the present general inventive concept will become apparent and more readily appreciated from the following description of the embodiments, taken in conjunction with the accompanying drawings in which:

FIGS. 2A to 2E illustrate processes of setting each option in the method of setting a printing option through a touch input, according to exemplary embodiments of the present general inventive concept;

FIGS. 3A to 3F illustrate processes of setting an option when the method of setting a printing option through a touch input is implemented as a 3D view, according to exemplary embodiments of the present general inventive concept;

FIGS. 5 to 10 are flowcharts illustrating operations included in the method of setting a printing option through a touch input, according to exemplary embodiments of the present general inventive concept.

DETAILED DESCRIPTION OF THE EMBODIMENTS

Figure 1:
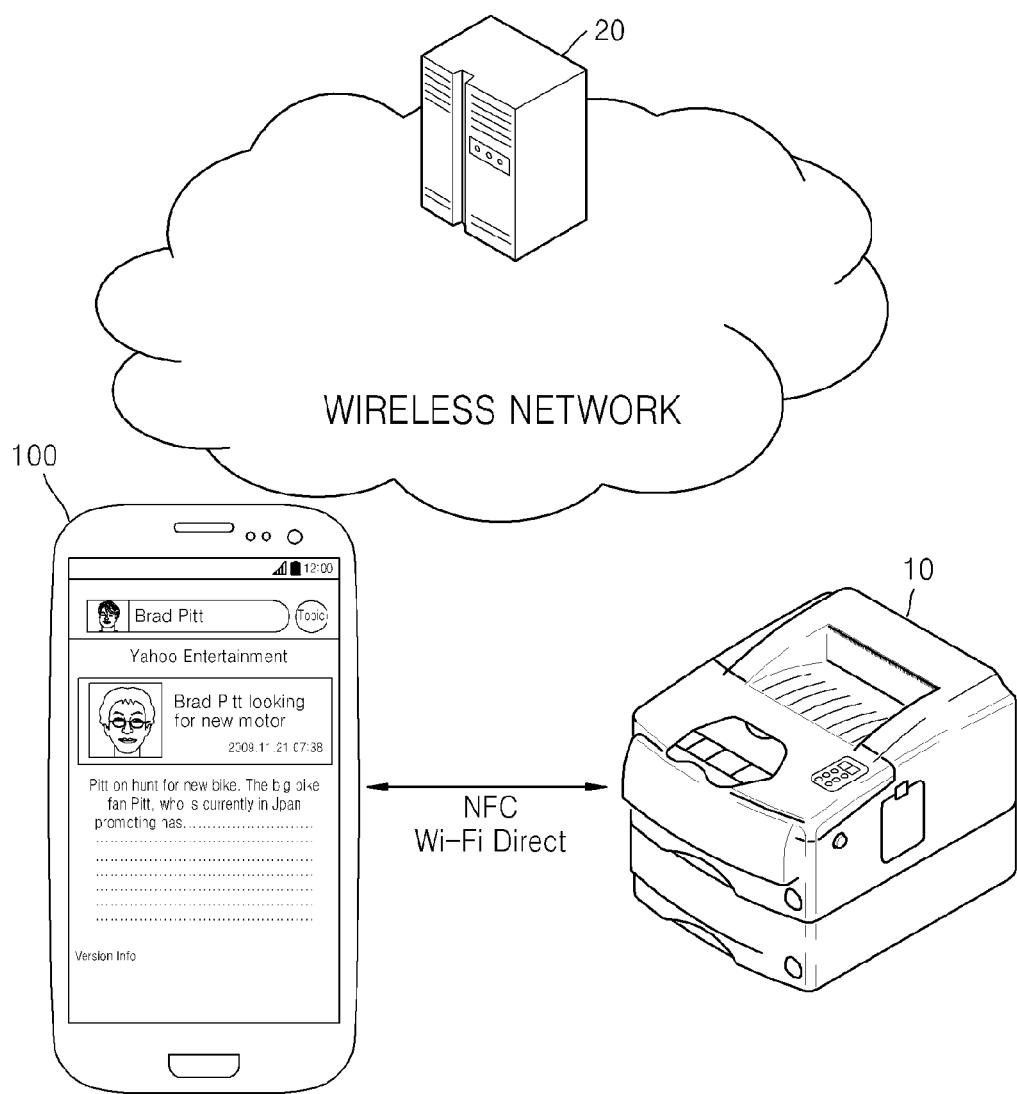
FIG. 1 is a conceptual diagram of a mobile-based printing environment to which a method of setting a printing option according to an exemplary embodiment of the present general inventive concept is applied.

Reference will now be made in detail to exemplary embodiments of the present general inventive concept, examples of which are illustrated in the accompanying drawings, wherein like reference numerals refer to the like elements throughout. The embodiments are described below in order to explain the present general inventive concept while referring to the figures. In this regard, the present exemplary embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

FIG. 1 is a conceptual diagram of a mobile-based printing environment to which a method of setting a printing option according to an exemplary embodiment of the present general inventive concept is applied. Referring to FIG. 1, a mobile device 100, an all-in-one device 10, and a cloud server 20 may be connected to each other over a wireless network and transmit and receive printing data and various types of commands required for printing therebetween. In addition, since the mobile device 100 and the all-in-one device 10 both support near field communication (NFC), Wi-Fi Direct, or the like, direct printing to print content stored in the mobile device 100 with the all-in-one device 10 is possible with only a simple NFC tagging operation.

In this mobile-based printing environment, a user may set a printing option in the mobile device 100. According to a method of setting a printing option according to an exemplary embodiment of the present general inventive concept, a printing option may be relatively easily and conveniently set by an intuitive touch input of the user through a graphic user interface (GUI) displayed on a screen of the mobile device 100. The method of setting a printing option through a touch input will now be described in detail with reference to the accompanying drawings.

FIGS. 2A to 2E illustrate processes of setting each option in the method of setting a printing option through a touch input, according to exemplary embodiments of the present general inventive concept.

Figure 2A:
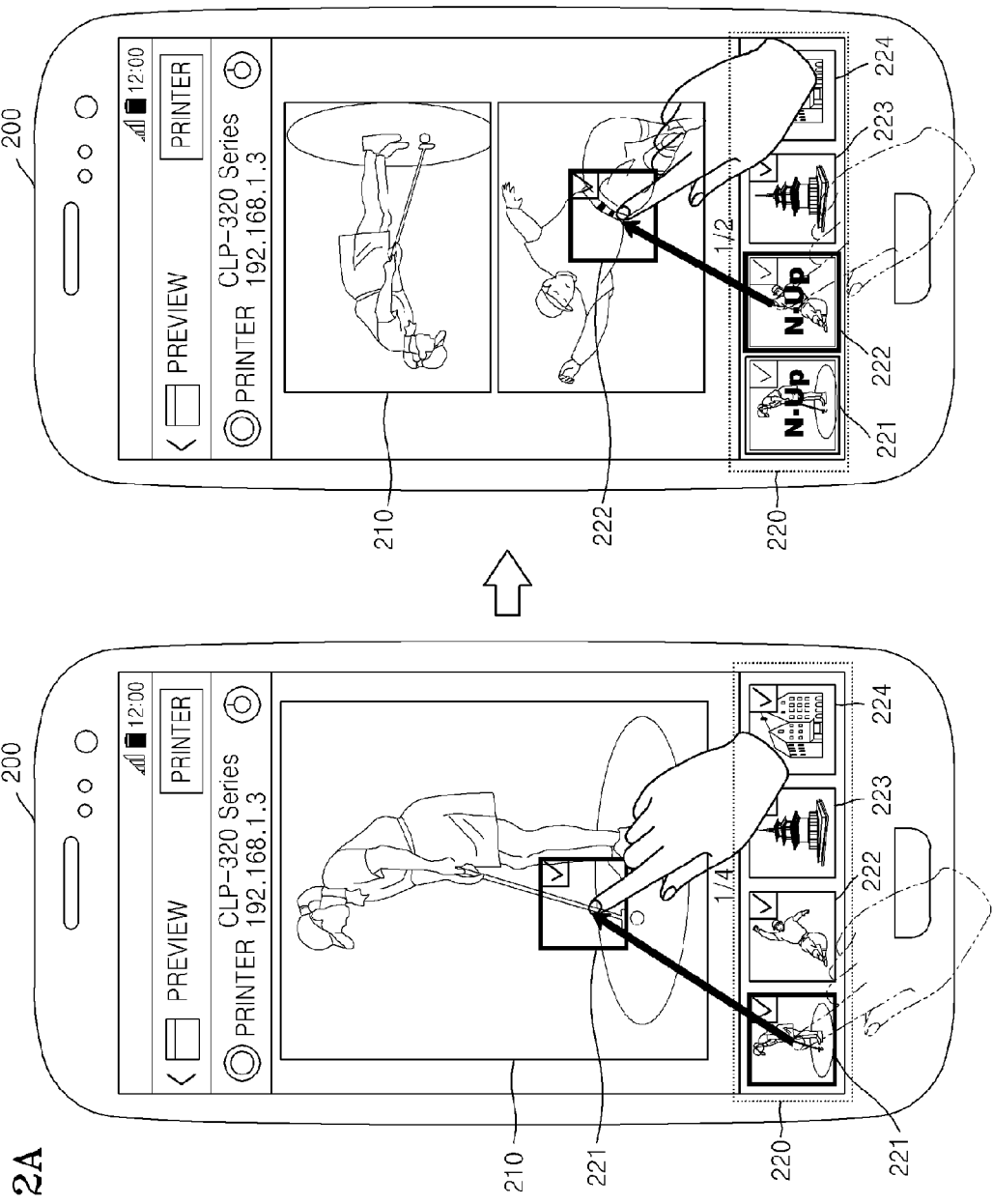

FIG. 2A illustrates a process of setting an N-up printing option in the method of setting a printing option, according to an exemplary embodiment of the present general inventive concept. The N-up printing option indicates an option of printing the content of two or more pages on one sheet of printing paper. Referring to FIG. 2A, on a preview screen 200 of a mobile device, a virtual sheet of paper 210 that corresponds to a frame for printing is displayed, and first to fourth thumbnails 221 to 224 corresponding to content available for printing are displayed in a thumbnail display area 220. The content available for printing may include for example pictures, documents, or other information to be printed by an image forming device such as the all-in-one device 10 illustrated in FIG. 1.

Before describing in detail a touch input operation to set an option, a basic touch input operation will be described in brief.

A user may perform an operation, such as selecting, moving, rotating, or turning over, the virtual sheet of paper 210 and the first to fourth thumbnails 221 to 224 displayed on the preview screen 200. In detail, if a short touch input on any one of the first to fourth thumbnails 221 to 224 is received, the touched thumbnail 221, 222, 223, or 224 is selected. If a user's finger moves in a state of a long touch on a thumbnail 221, 222, 223, or 224 with the finger, the touched thumbnail 221, 222, 223, or 224 moves along the finger until the touch ends, and this operation is referred to as a "drag and drop" hereinafter. In addition, a front or rear surface of the virtual sheet of paper 210 may be switched by vertically or horizontally moving a finger to slide on the virtual sheet of paper 210, and if a finger moves in a state of touching one corner of the virtual sheet of paper 210, the virtual sheet of paper 210 may be rotated from a vertical direction to a horizontal direction or vice versa. These operations are illustrated in FIGS. 2A-E with the illustrations of a user's hand. A hand illustrated in dashed lines indicates a beginning of a touch input, for example the starting point of a drag and drop operation. A hand illustrated in solid lines indicates an end of a touch input, for example the end point of a drag and drop operation.

Referring back to FIG. 2A, according to view (a), if the first thumbnail 221 is dragged and dropped onto the virtual sheet of paper 210, content corresponding to the first thumbnail 221 is displayed on the virtual sheet of paper 210. According to view (b), in a state where the content corresponding to the first thumbnail 221 is displayed on the virtual sheet of paper 210, the second thumbnail 222 is dragged and dropped onto the virtual sheet of paper 210. As such, if two or more thumbnails are dragged and dropped onto the one virtual sheet of paper 210, the mobile device determines N-up printing, that is, printing multiple pages of content on one side of a single sheet of printing paper, and displays the content corresponding to the first thumbnail 221 and content corresponding to the second thumbnail 222 on the virtual sheet of paper 210 as illustrated in view (b) of FIG. 2A. In addition, a mask image indicating that an N-up printing option has been set overlaps with the first thumbnail 221 and the second thumbnail 222 in the thumbnail display area 220.

Figure 2B:
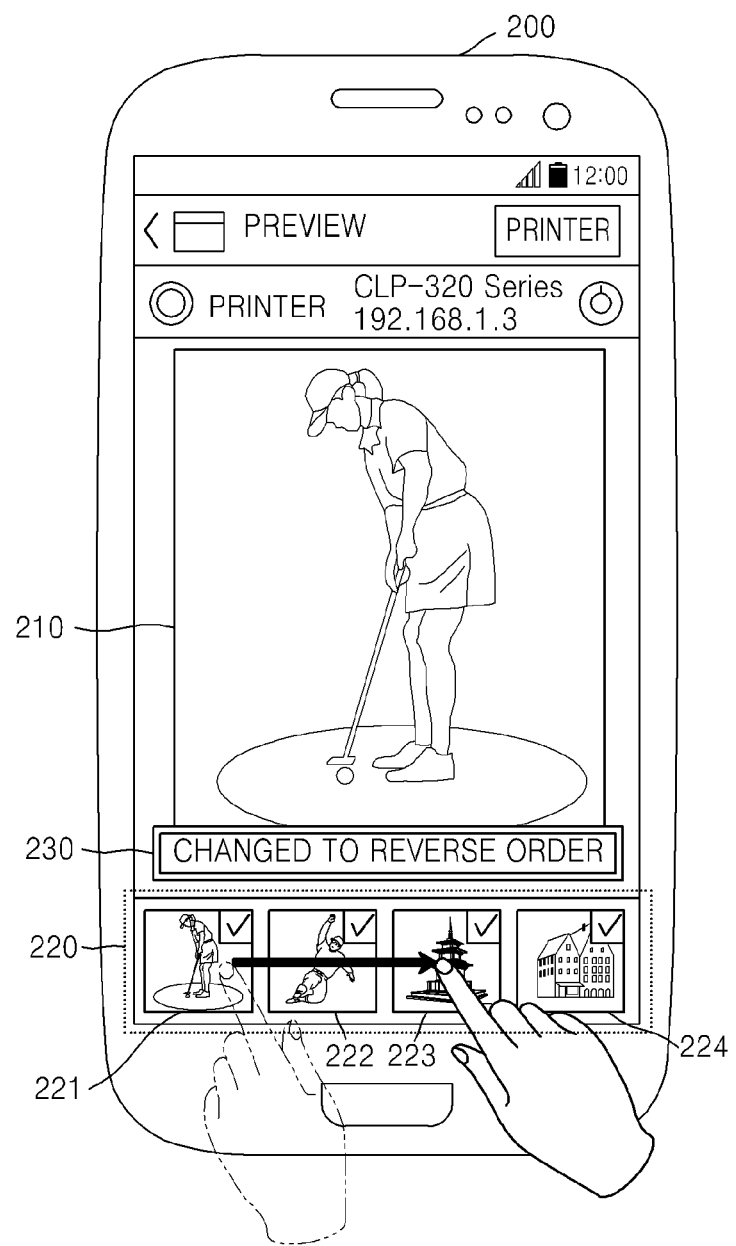

FIG. 2B illustrates a process of changing a printing order in the method of setting a printing option, according to an exemplary embodiment of the present general inventive concept. Referring to FIG. 2B, the first to third thumbnails 221 to 223 from among the first to fourth thumbnails 221 to 224 in the thumbnail display area 220 are selected to be printed. In this case, although the first to third thumbnails 221 to 223 are basically printed according to an arrangement order of the first to third thumbnails 221 to 223, the printing order may be changed through a simple touch input. If a slide touch input on the thumbnail display area 220 is received, the printing order may be changed according to a preset criterion. A slide touch input corresponds to a continuous touch while the user's finger or other touching object moves across the screen. In the exemplary embodiment illustrated in FIG. 2B, when the illustrated slide touch input is received while in an original state, a message 230 indicating that the printing order is changed to a reverse order is displayed. That is, the printing order is set in an order of the third thumbnail 223, the second thumbnail 222, and the first thumbnail 221.

It will be understood that the thumbnails may be rearranged differently when the slide touch input is made, according to the preset criterion. For example, if the slide input begins on a first thumbnail 221 and ends on another thumbnail, for example 223, the locations of those thumbnails 221 and 223 could be swapped while the other thumbnails are not moved. Alternatively, if the slide input begins on the first thumbnail 221, the location of the first thumbnail 221 could be moved to the end location of the slide input. Furthermore, when the printing order is changed in this fashion, the content displayed on the virtual sheet of paper 210 may be changed accordingly. For example, when content corresponding to the first thumbnail 221 is displayed on the virtual sheet of paper 210 and the printing order is changed to a reverse order, such that the third thumbnail 223 becomes first in the printing order, content corresponding to the third thumbnail 223 could be displayed on the virtual sheet of paper 210. Alternatively, the content displayed on the virtual sheet of paper 210 could be unchanged by rearranging the print order, depending on the particular exemplary embodiment of the present general inventive concept.

In a state where the printing order is changed to the reverse order, if a slide touch input on the thumbnail display area 220 is received again, the printing order may be changed to another preset printing order. For example, the printing order may be changed to an odd page order or an even page order. The printing order may be arbitrary and set by the user according to circumstances.

Figure 2C:
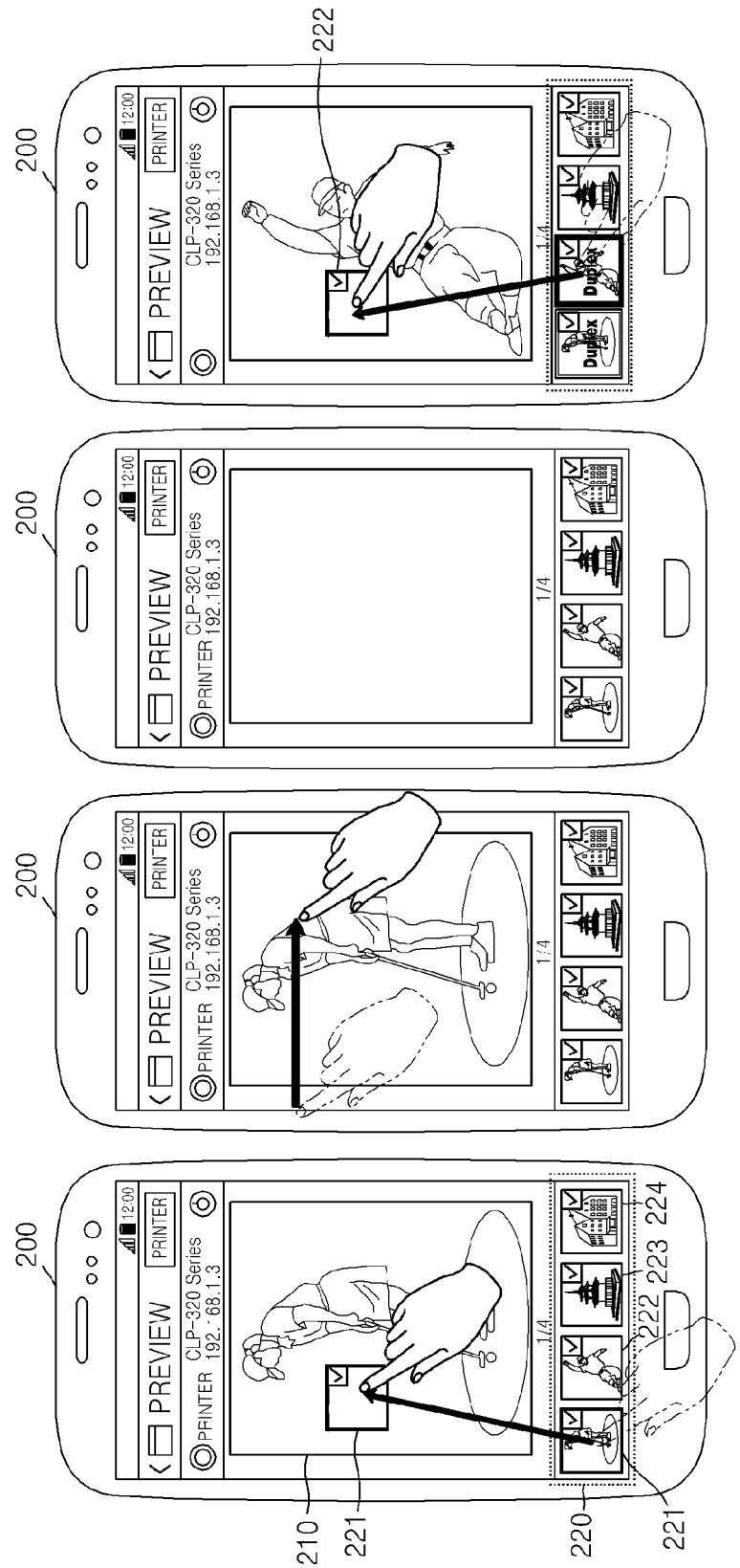
Figure 2D:
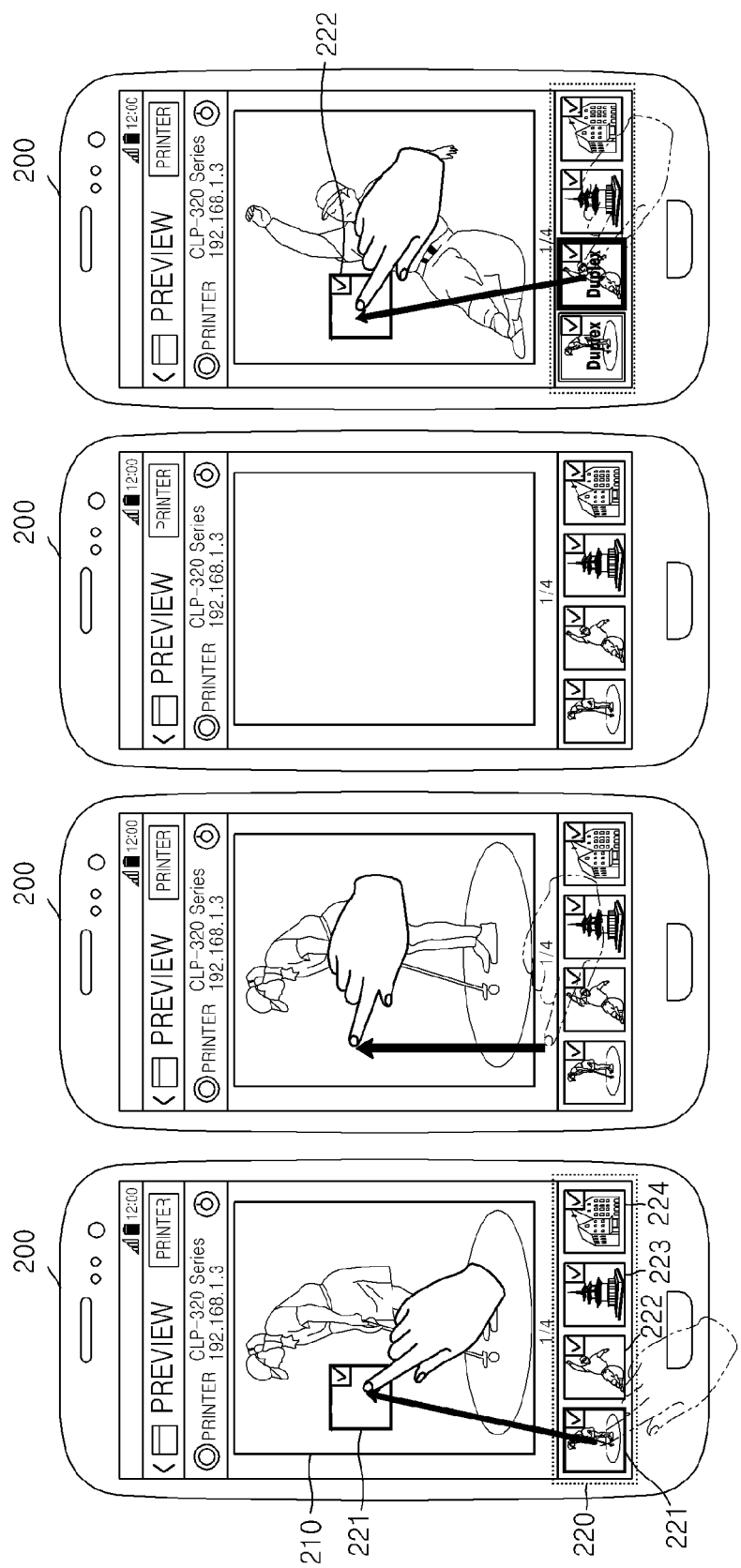

FIGS. 2C and 2D illustrate a process of setting a duplex printing option in the method of setting a printing option, according to an exemplary embodiment of the present general inventive concept. FIG. 2C illustrates long-edge duplex in which printing is performed by turning paper over with a long edge of the paper as an axis, and FIG. 2D illustrates short-edge duplex in which printing is performed by turning paper over with a short edge of the paper as an axis. "Duplex printing" is defined herein as performing printing on both sides of a sheet of printing paper.

Referring to FIG. 2C, in view (a), if the first thumbnail 221 is dragged and dropped onto the virtual sheet of paper 210, content corresponding to the first thumbnail 221 is displayed on the virtual sheet of paper 210. In view (b), if a horizontal slide touch input on the virtual sheet of paper 210 is received, the virtual sheet of paper 210 is turned over with a long edge as an axis. Accordingly, in view (c), a rear surface of the virtual sheet of paper 210 is displayed. In view (d), the second thumbnail 222 is dragged and dropped onto the rear surface of the virtual sheet of paper 210, and content corresponding to the second thumbnail 222 is displayed on the rear surface of the virtual sheet of paper 210. Thereafter, a mask image indicating duplex printing is displayed on the first and second thumbnails 221 and 222 in the thumbnail display area 220.

Referring to FIG. 2D, in view (a), if the first thumbnail 221 is dragged and dropped onto the virtual sheet of paper 210, content corresponding to the first thumbnail 221 is displayed on the virtual sheet of paper 210. In view (b), if a vertical slide touch input on the virtual sheet of paper 210 is received, the virtual sheet of paper 210 is turned over with a short edge as an axis. Accordingly, in view (c), a rear surface of the virtual sheet of paper 210 is displayed. In view (d), the second thumbnail 222 is dragged and dropped onto the rear surface of the virtual sheet of paper 210, and content corresponding to the second thumbnail 222 is displayed on the rear surface of the virtual sheet of paper 210. Thereafter, a mask image indicating duplex printing is displayed on the first and second thumbnails 221 and 222 in the thumbnail display area 220.

FIG. 2E illustrates a process of changing a printing direction in the method of setting a printing option, according to an exemplary embodiment of the present general inventive concept. Referring to FIG. 2E, in view (a), a touch input of rotating the virtual sheet of paper 210 is received. The user may rotate the virtual sheet of paper 210, thereby changing the orientation of the virtual sheet of paper 210, by rotating two fingers in a state where the user touches the virtual sheet of paper 210 with the two fingers at the same time. The virtual sheet of paper 210 rotated by the touch input is illustrated in view (b). In view (c), if the first thumbnail 221 is dragged and dropped onto the virtual sheet of paper 210, a printing direction is set as landscape, according to the landscape orientation of the virtual sheet of paper 210. Thereafter, a mask image indicating a landscape printing direction is displayed on the first thumbnail 221 in the thumbnail display area 220. As described above, a printing direction of portrait or landscape may be set by rotating a direction of the virtual sheet of paper 210, thereby changing the orientation of the virtual sheet of paper 210, before adding a thumbnail onto the virtual sheet of paper 210.

As described in the above exemplary embodiments, a printing option may be simply and intuitively set by manipulating the virtual sheet of paper 210, which is a frame of printing, and the first to fourth thumbnails 221 to 224, which correspond to content to be printed, on the preview screen 200 through a touch input.

According to another exemplary embodiment of the present general inventive concept, a more realistic and intuitive method of setting an option may be provided to a user by providing a preview as a 3D view.

FIGS. 3A to 3F illustrate processes of setting an option when the method of setting a printing option through a touch input is implemented as a 3D view, according to exemplary embodiments of the present general inventive concept. For the purposes of the exemplary embodiments of the present general inventive concept illustrated herein, "3D view" is illustrated as a perspective view of one or more virtual sheets of paper. Such a perspective view allows a user to view the thickness of the virtual sheets of paper and the relative order of the virtual sheets of paper relative to one another, as described below with reference to FIGS. 3A-3F.

Furthermore, as illustrated in FIGS. 3A-F, when content corresponding to one or more of the thumbnails 321-324 is displayed on a virtual sheet of paper 310, 311, 312, etc., the corresponding thumbnails may be illustrated as blank pages, to visually indicate which content is currently arranged on the virtual sheet of paper 310, 311, 312, etc.

Figure 3A:
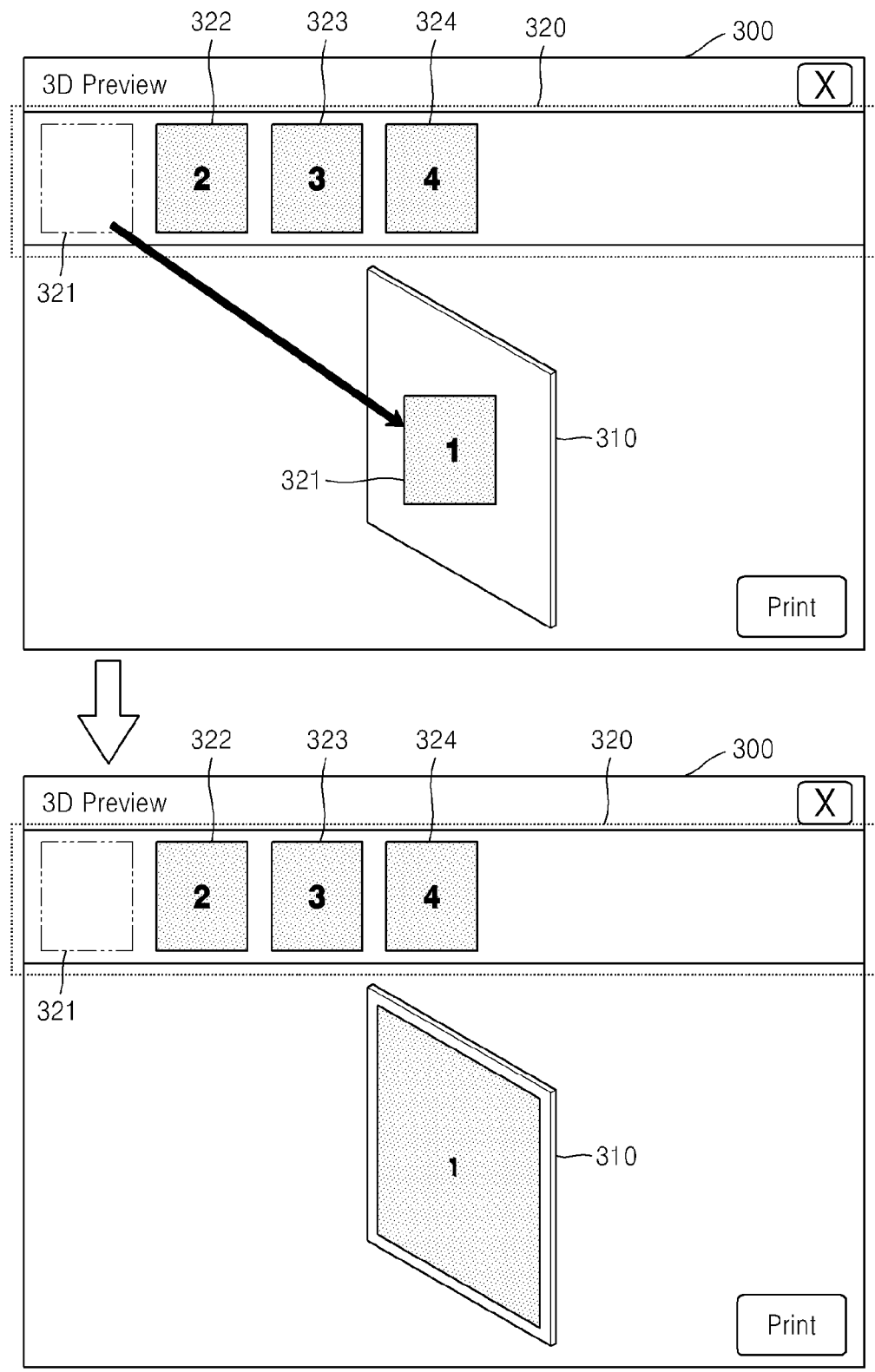

FIG. 3A illustrates a process of performing standard printing on a 3D preview. A virtual sheet of paper 310 is displayed as a 3D view on a preview screen 300. First to fourth thumbnails 321 to 324 are displayed in a thumbnail display area 320. In view (a), if the first thumbnail 321 is dragged and dropped onto the virtual sheet of paper 310, content corresponding to the first thumbnail 321 is displayed on the virtual sheet of paper 310 as illustrated in view (b). In this case, basic simplex printing, meaning one page of content is printed on one side of a single page of printing paper, is performed for the content corresponding to the first thumbnail 321. FIG. 3A illustrates a 3D embodiment of the operations illustrated in view (a) of FIG. 2A.

Figure 3B:
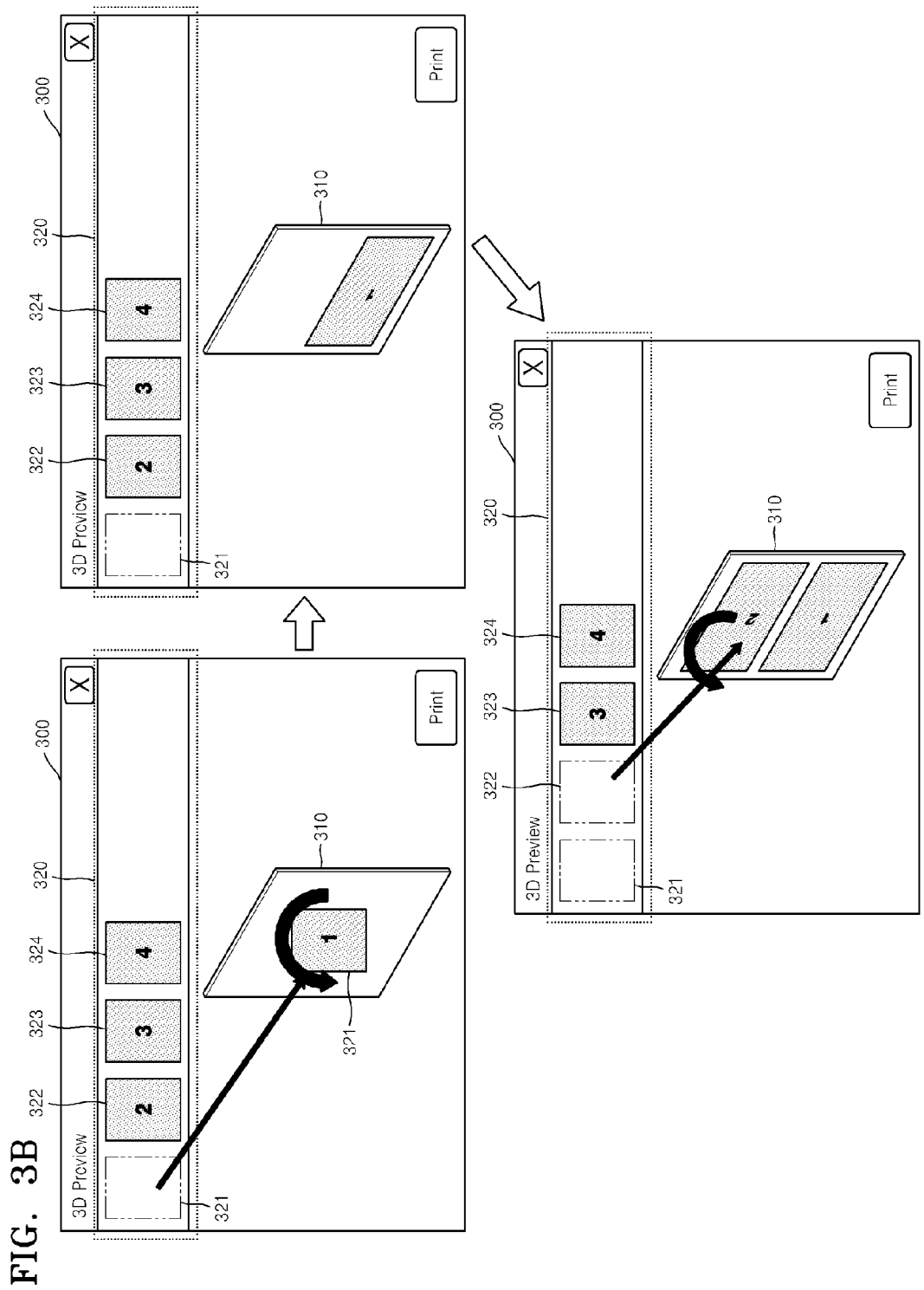

FIG. 3B illustrates a process of setting an N-up printing option on a 3D preview, according to an exemplary embodiment of the present general inventive concept. In view (a), a touch input of dragging and dropping the first thumbnail 321 onto the virtual sheet of paper 310 is received, and the first thumbnail 321 is simultaneously rotated counterclockwise. A mobile device analyzes the touch input of rotating the first thumbnail 321 as N-up option setting and displays content corresponding to the first thumbnail 321 on a half of the virtual sheet of paper 310 as illustrated in view (b). In view (c), if the second thumbnail 322 is dragged and dropped onto the virtual sheet of paper 310 and rotated, content corresponding to the second thumbnail 322 is displayed on the other half of the virtual sheet of paper 310. FIG. 3B illustrates a 3D embodiment of the operations illustrated in view (b) of FIG. 2A.

Figure 3C:
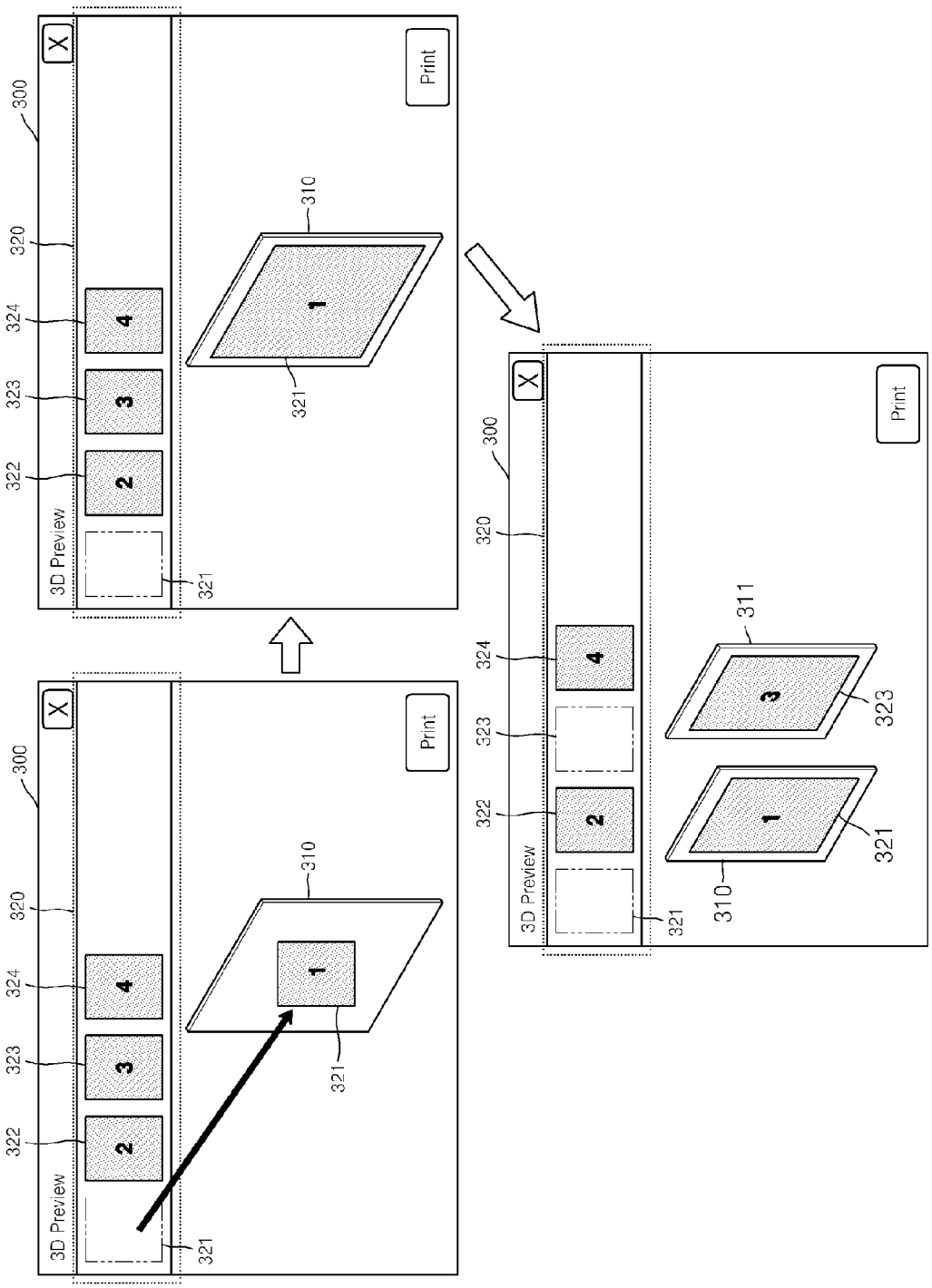

FIG. 3C illustrates a process of setting a printing order on a 3D preview, according to an exemplary embodiment of the present general inventive concept. In view (a), if the first thumbnail 321 is dragged and dropped onto the virtual sheet of paper 310, content corresponding to the first thumbnail 321 is displayed on the virtual sheet of paper 310 as illustrated in view (b). Thereafter, a new virtual sheet of paper 311 is added, and if the third thumbnail 323 is dragged and dropped onto the added virtual sheet of paper 311, content corresponding to the third thumbnail 323 is displayed on the added virtual sheet of paper 311 as illustrated in view (c). Accordingly, a printing order is set so that the content corresponding to the third thumbnail 323 is printed after printing the content corresponding to the first thumbnail 321.

Figure 3D:
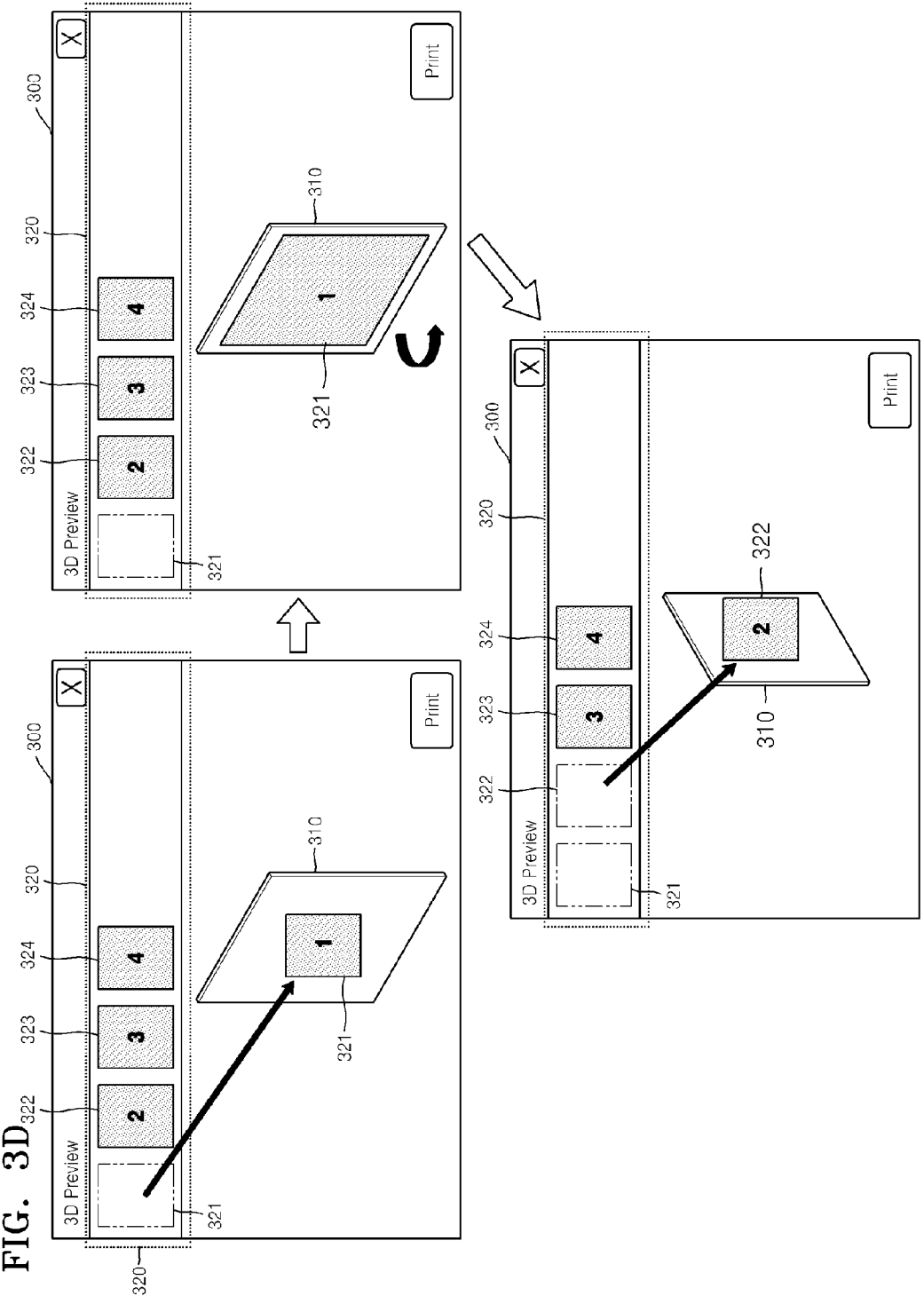

FIG. 3D illustrates a process of setting a duplex printing option on a 3D preview, according to an exemplary embodiment of the present general inventive concept. The first thumbnail 321 is dragged and dropped onto the virtual sheet of paper 310 in view (a), and the virtual sheet of paper 310 is turned over with a long edge as an axis in view (b). In view (c), the second thumbnail 322 is dragged and dropped onto a rear surface of the virtual sheet of paper 310, thereby setting the duplex printing option. The duplex printing may also be set by turning the virtual sheet of paper 310 over with a short edge as an axis and dragging and dropping a thumbnail onto the rear surface of the virtual sheet of paper 310. FIG. 3D illustrates a 3D embodiment of the operations illustrated in FIGS. 2C-D.

FIG. 3E illustrates a process of changing a printing direction on a 3D preview, according to an exemplary embodiment of the present general inventive concept. In view (a), if the user rotates the virtual sheet of paper 310 counterclockwise by about 90° in a state where the user touches one edge of the virtual sheet of paper 310 with a finger, the virtual sheet of paper 310 is rotated and displayed as illustrated in view (b). In this state, the first thumbnail 321 is dragged and dropped onto the virtual sheet of paper 310 as illustrated in view (c), thereby setting a printing direction as landscape. FIG. 3E illustrates a 3D embodiment of the operations illustrated in FIG. 2E.

Figure 3F:
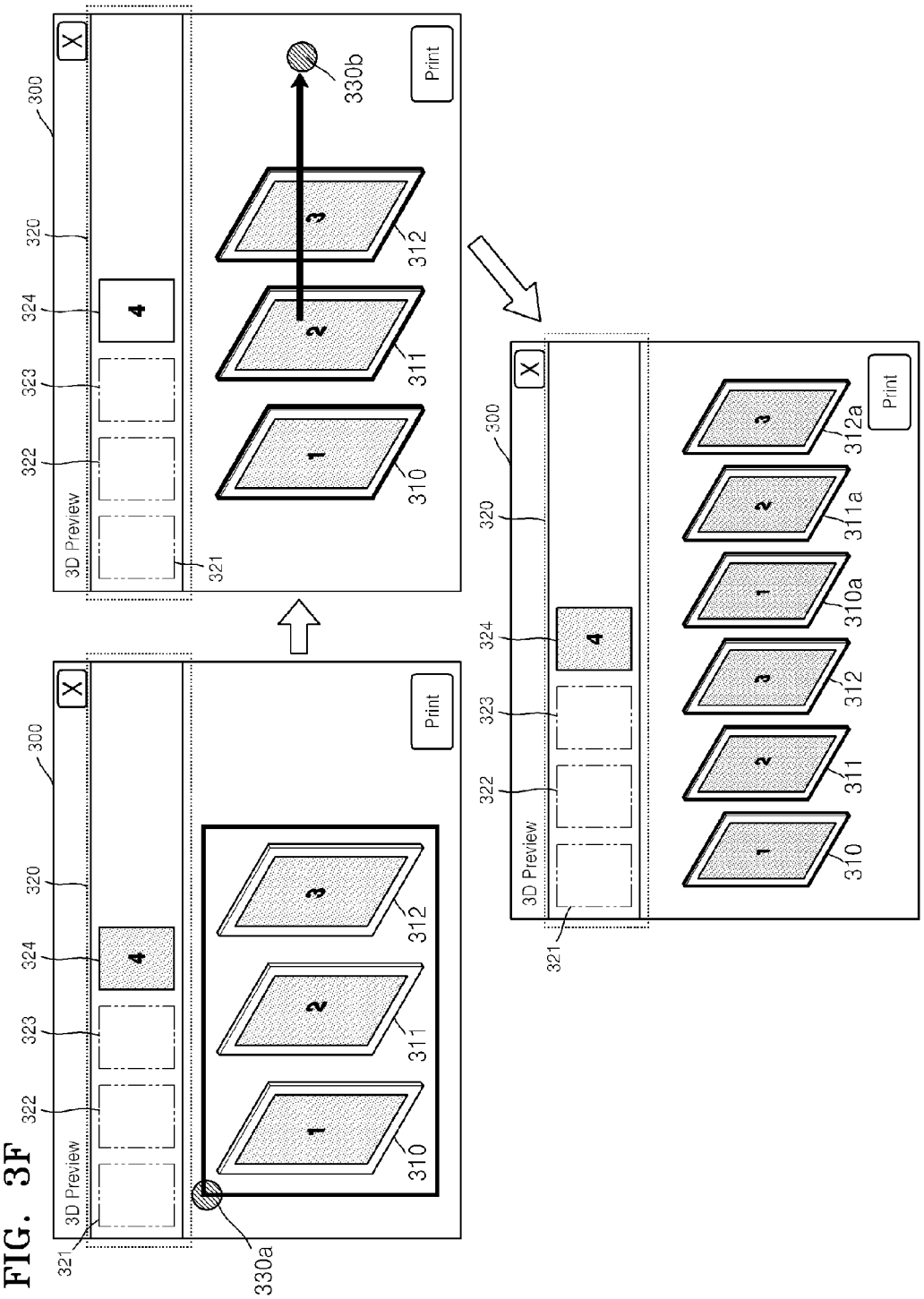

FIG. 3F illustrates a process of setting the number of sheets of paper to be printed on a 3D preview, according to an exemplary embodiment of the present general inventive concept. In view (a), all of displayed three virtual sheets of paper 310, 311, and 312 may be selected by touching a vacant area 330a on the preview screen 300. In this state, if the user moves a finger to another vacant area 330b on the preview screen 300 in a state of touching the any one virtual sheet of paper 311 with the finger as illustrated in view (b), three new virtual sheets of paper 310a, 311a, and 312a copied from the selected three virtual sheets of paper 310, 311, and 312 are added as illustrated in view (c). As a result, each of the pieces of content corresponding to the first to third thumbnails 321 to 323 is printed on two sheets.

Figure 4:
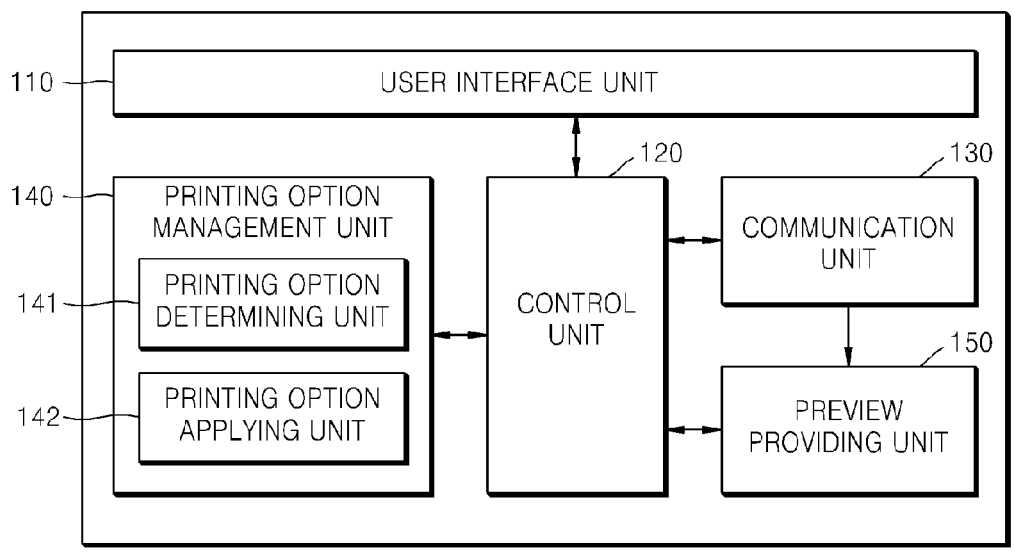
FIG. 4 is a block diagram of a mobile device according to an exemplary embodiment of the present general inventive concept.

FIG. 4 is a block diagram of the mobile device 100 according to an exemplary embodiment of the present general inventive concept. Referring to FIG. 4, the mobile device 100 may include a user interface unit 110, a control unit 120, a communication unit 130, a printing option management unit 140, and a preview providing unit 150, wherein the printing option management unit 140 may include a printing option determining unit 141 and a printing option applying unit 142.

The user interface unit 110 may display a preview to a user and receive a touch input from the user. The communication unit 130 transmits and receives data for mobile printing, for example to an external apparatus such as the all-in-one device 10 illustrated in FIG. 1. The communication unit 130 may transmit this data after content is arranged according to any of the operations illustrated in FIGS. 2A-E and 3A-F, the data corresponding to the content so arranged. The printing option management unit 140 sets a printing option based on a touch input of the user. Herein, the printing option determining unit 141 analyzes the touch input and determines a corresponding printing option, and the printing option applying unit 142 applies the determined printing option. The preview providing unit 150 provides a preview which includes a virtual sheet of paper as a frame and a thumbnail corresponding to content to be printed. When a printing option is changed, the preview providing unit 150 may display a preview by reflecting the changed printing option. The control unit 120 controls operations of the components described above.

The above description with respect to FIGS. 2A to 3F is referred to for operations of the components included in the mobile device 100 when a concrete printing option is set.

FIGS. 5 to 10 are flowcharts illustrating operations included in the method of setting a printing option through a touch input, according to exemplary embodiments of the present general inventive concept.

Figure 5:
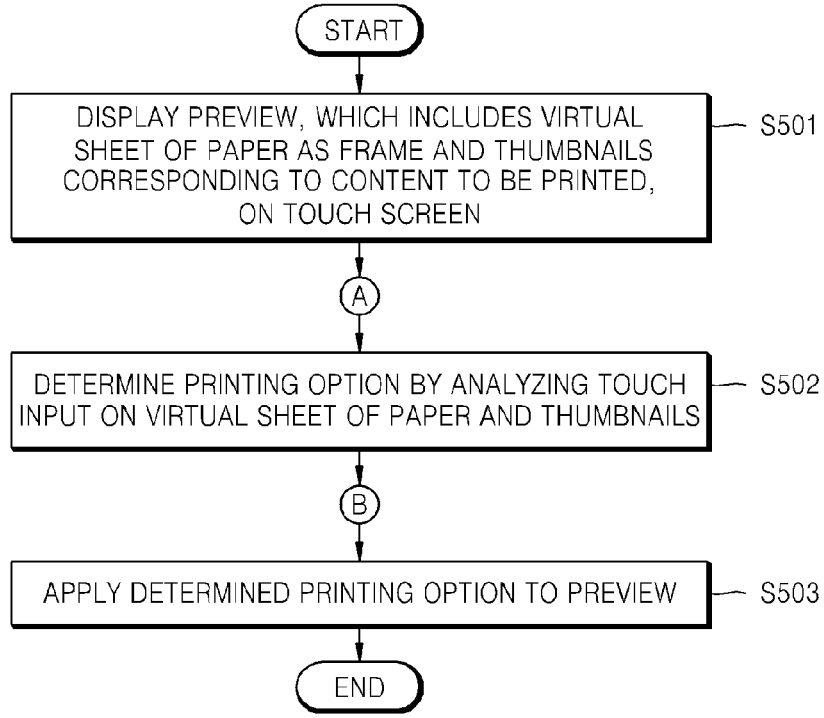

Referring to FIG. 5, in operation S501, a preview which includes a virtual sheet of paper as a frame and thumbnails corresponding to content to be printed is displayed on a touch screen of a mobile device. In operation S502, a touch input of a user on the virtual sheet of paper and the thumbnails is received and analyzed to determine a corresponding printing option. In operation S503, the determined printing option is applied to and displayed on the preview.

FIGS. 6 to 10 are flowcharts illustrating detailed operations of operation S502 of FIG. 5, i.e., analyzing a touch input to determine a printing option, according to exemplary embodiments of the present general inventive concept.

Referring to FIG. 6, if a touch input of dragging and dropping at least one of the thumbnails onto the virtual sheet of paper is received in operation S601, the number of thumbnails dragged and dropped onto the virtual sheet of paper is checked in operation S602. It is determined in operation S603 whether two or more thumbnails have been dragged and dropped onto the virtual sheet of paper. As a result of the determination in operation S603, if two or more thumbnails have been dragged and dropped onto the virtual sheet of paper (operation S603-Y), N-up printing is determined in operation S604. Otherwise (operation S603-N), standard printing is determined in operation S605.

Referring to FIG. 7, if a slide touch input in a thumbnail display area is received in operation S701, a change in a printing order of the thumbnails is determined in operation S702.

Figure 8:
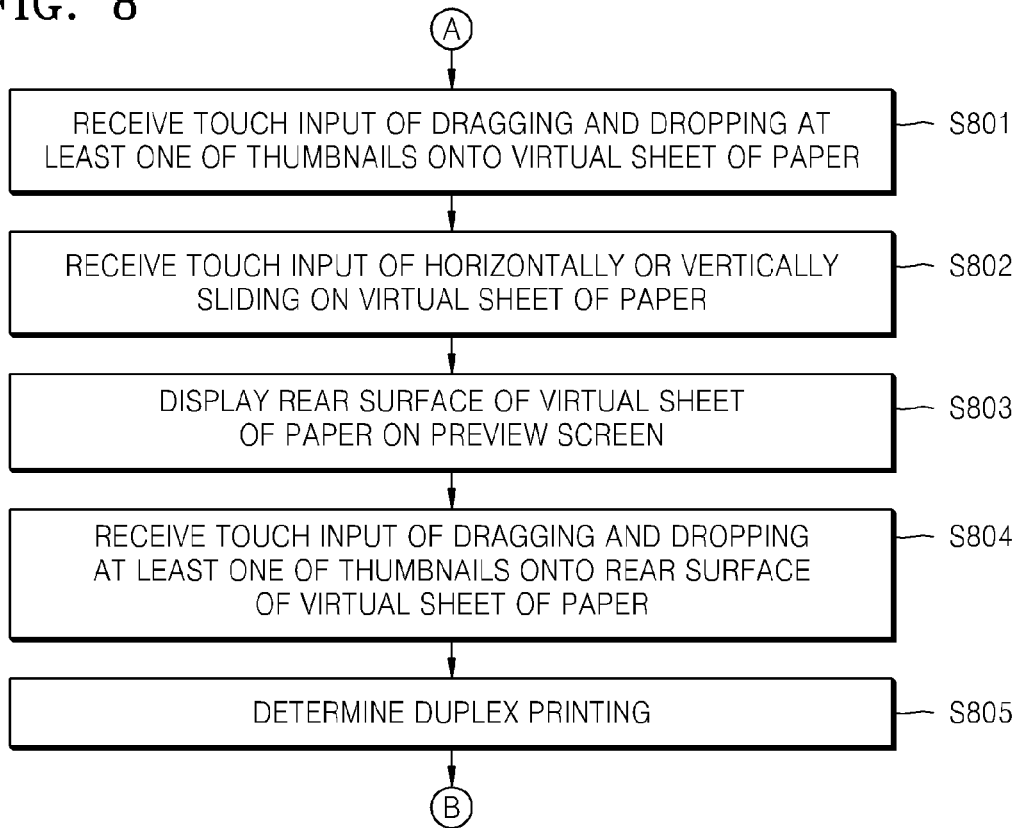

Referring to FIG. 8, a touch input of dragging and dropping at least one of the thumbnails onto the virtual sheet of paper is received in operation S801. If a touch input of horizontally or vertically sliding on the virtual sheet of paper is received in operation S802, a rear surface of the virtual sheet of paper is displayed on a preview screen in operation S803. If a touch input of dragging and dropping at least one of the thumbnails onto the rear surface of the virtual sheet of paper is received in operation S804, duplex printing is determined in operation S805.

Figure 9:
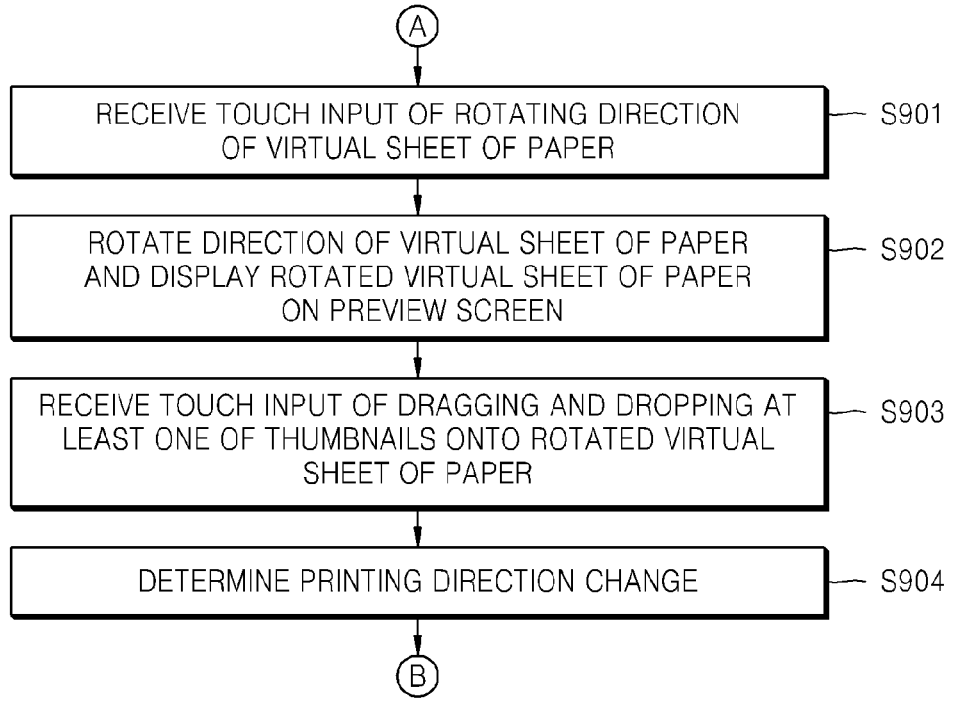

Referring to FIG. 9, a touch input of rotating a direction of the virtual sheet of paper is received in operation S901, and the direction of the virtual sheet of paper is rotated and displayed on a preview screen in operation S902. If a touch input of dragging and dropping at least one of the thumbnails onto the rotated virtual sheet of paper is received in operation S903, a printing direction change is determined in operation S904.

Figure 10:
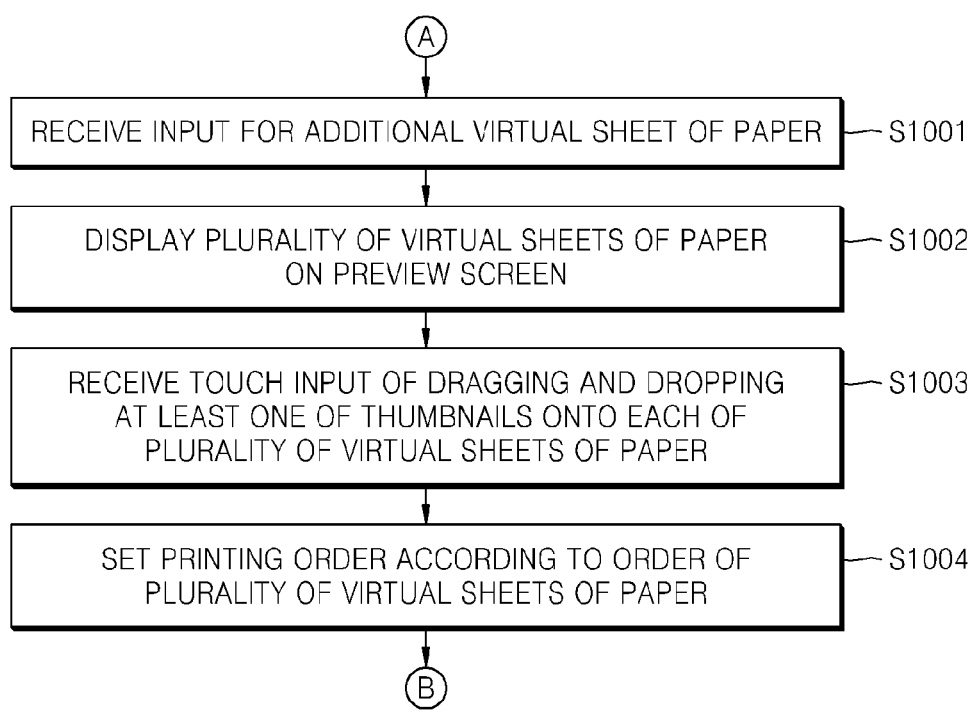

Referring to FIG. 10, if an input for one or more additional virtual sheets of paper is received in operation S1001, a corresponding plurality of virtual sheets of paper are displayed on a preview screen in operation S1002. If a touch input of dragging and dropping at least one of the thumbnails onto each of the plurality of virtual sheets of paper is received in operation S1003, a printing order is set according to an order of the plurality of virtual sheets of paper in operation S1004.

As described above, according to the one or more of the above exemplary embodiments of the present general inventive concept, by displaying a virtual sheet of paper as a frame for printing and a thumbnail corresponding to each page of content on a screen for a preview of the content and analyzing a touch input on the virtual sheet of paper and a thumbnail to determine a printing option, a user may intuitively set a printing option through a simple touch input. This increases the user's convenience while setting print options through the mobile device.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It should be understood that the exemplary embodiments of the present general inventive concept described therein should be considered in a descriptive sense only and not for purposes of limitation. Descriptions of features or aspects within each exemplary embodiment should typically be considered as available for other similar features or aspects in other exemplary embodiments.

The touch inputs described with regard to the above exemplary embodiments of the present general inventive concept are presented only as examples. It will be understood that alternative touch inputs may be used, such as for example tap, double tap, and so on. Furthermore, it will be understood that "touch input" may include a user's finger touching a touch screen, as well as for example a stylus (not illustrated) or other input device touching the touch screen. "Touch input" may further include non-contact inputs similar to touch inputs on a touch screen, for example user gestures detected in proximity to the mobile device 100.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of setting a printing option through a touch input, the method comprising:
   displaying a preview screen, which includes a virtual sheet of paper and thumbnails corresponding to content to be printed, on a touch screen of a mobile device;
   determining the printing option by receiving and analyzing the touch input on the virtual sheet of paper and at least one thumbnail of the thumbnails;
   applying the determined printing option to an image which is displayed on the preview screen; and
   displaying a mask image, which corresponds to the determined printing option, on the at least one thumbnail that corresponds to the image, based on the touch input on the virtual sheet of paper.

2. The method of claim 1, wherein the determining the printing option comprises:
   receiving the touch input of dragging and dropping at least one of the thumbnails onto the virtual sheet of paper;
   checking the number of thumbnails dragged and dropped on the virtual sheet of paper; and
   determining N-up printing if the checked number of thumbnails is greater than one.

3. The method of claim 1, wherein the determining the printing option comprises:
   receiving a slide touch input in a region in which the thumbnails are displayed on the preview; and
   determining a change in a printing order set for the thumbnails.

4. The method of claim 1, wherein the determining the printing option comprises:
   receiving a touch input of dragging and dropping at least one of the thumbnails onto the virtual sheet of paper;
   receiving a touch input of horizontally or vertically sliding on the virtual sheet of paper;
   displaying a rear surface of the virtual sheet of paper on the preview;
   receiving the touch input of dragging and dropping at least one of the thumbnails onto the rear surface of the virtual sheet of paper; and
   determining duplex printing.

5. The method of claim 1, wherein the determining the printing option comprises:
   receiving a touch input of rotating on the virtual sheet of paper;
   rotating an orientation of the virtual sheet of paper according to the touch input of rotating and displaying the virtual sheet of paper on the preview screen according to the rotated orientation;
   receiving the touch input of dragging and dropping at least one of the thumbnails onto the rotated virtual sheet of paper; and
   determining a printing direction change.

6. The method of claim 1, wherein the determining the printing option comprises:
   receiving an input for one or more additional virtual sheets of paper;
   displaying a corresponding plurality of virtual sheets of paper on the preview screen;
   receiving the touch input of dragging and dropping at least one of the thumbnails onto each of the plurality of virtual sheets of paper; and
   setting a printing order according to an order of the plurality of virtual sheets of paper.

7. The method of claim 1, wherein the applying the determined printing option comprises displaying content corresponding to a selected one of the thumbnails on the virtual sheet of paper according to the determined printing option.

8. The method of claim 1, wherein, during the preview, the virtual sheet of paper is displayed as a three-dimensional (3D) view.

9. A non-transitory computer-readable medium to contain computer-readable codes as a program to execute the method of claim 1.

10. The method of claim 1, wherein the printing option comprises one or more of duplex printing images by putting the image on at least one side of two different sides of the virtual piece of paper, landscape printing of the image on the virtual sheet of paper, and inserting a plurality of images, including the image, on a single side of the virtual piece of paper.

11. A mobile device comprising:
    a graphical user interface (GUI) to receive a touch input from a user;
    a hardware processor programmed to:
       provide a preview screen, which includes a virtual sheet of paper and thumbnails corresponding to content to be printed, to the GUI so that the preview screen is displayed on the GUI, set a printing option based on the touch input on the virtual sheet of paper and at least one thumbnail of the thumbnails, apply the set printing option to an image which is displayed on the preview screen, and control the GUI to display a mask image, which indicates the set printing option determined by the hardware processor, on the at least one thumbnail that corresponds to the image, displayed on the virtual sheet of paper displayed on the GUI, based on the touch input on the virtual sheet of paper.

12. The mobile device of claim 11, wherein the hardware processor is further configured to determine a printing option by analyzing a touch input on the virtual sheet of paper and the thumbnails and to apply the determined printing option to the preview.

13. The mobile device of claim 12, wherein if the touch input of dragging and dropping at least one of the thumbnails onto the virtual sheet of paper is received through the GUI, the hardware processor checks the number of thumbnails dragged and dropped on the virtual sheet of paper and determines N-up printing if the checked number of thumbnails is greater than one.

14. The mobile device of claim 12, wherein if a slide touch input in a region in which the thumbnails are displayed on the preview screen is received through the GUI, the hardware processor determines a change in a printing order set for the thumbnails.

15. The mobile device of claim 12, wherein:

if a touch input of horizontally or vertically sliding on the virtual sheet of paper is received through the GUI after receiving a touch input of dragging and dropping at least one of the thumbnails onto the virtual sheet of paper, the hardware processor displays a rear surface of the virtual sheet of paper on the preview; and if the touch input of dragging and dropping at least one of the thumbnails onto the rear surface of the virtual sheet of paper displayed on the GUI is received, the hardware processor determines duplex printing.

16. The mobile device of claim 12, wherein if a touch input of rotating on the virtual sheet of paper is received through the GUI, the hardware processor causes the GUI to rotate an orientation of the virtual sheet of paper according to the touch input of rotating;

the GUI displays the virtual sheet of paper on the preview screen according to the rotated orientation; and if the touch input of dragging and dropping of at least one of the thumbnails onto the virtual sheet of paper displayed on the GUI having the rotated orientation is received, the hardware processor determines a printing direction change.

17. The mobile device of claim 12, wherein if an input for one or more additional virtual sheets of paper is received through the GUI, the hardware processor displays a corresponding plurality of virtual sheets of paper on the preview screen, and if the touch input of dragging and dropping at least one of the thumbnails onto each of the plurality virtual sheets of paper is received, the hardware processor sets a printing order according to an order of the plurality of virtual sheets of paper.

18. The mobile device of claim 12, wherein the hardware processor causes the GUI to display content corresponding to a selected one of the thumbnails on the virtual sheet of paper according to the printing option determined by the hardware processor.

19. The mobile device of claim 11, wherein the hardware processor displays the virtual sheet of paper as a three-dimensional (3D) view.

20. A method of displaying content on a mobile device, the method comprising:

displaying a virtual sheet of paper and at least one thumbnail of thumbnails displayed on a touch screen of the mobile device; and displaying content corresponding to the at least one thumbnail by arranging and displaying the content corresponding to the at least one thumbnail on the virtual sheet of paper according to a touch input on the virtual sheet of paper and the at least one thumbnail, wherein a printing option is determined from the touch input on the virtual sheet of paper, and wherein a mask image indicating the determined printing option is displayed on a selected thumbnail, of the thumbnails, that corresponds to the content displayed on the virtual sheet of paper, the mask image being based on the determined printing option and the touch input on the virtual sheet of paper.

21. The method of claim 20, further comprising obtaining a printing option according to the arrangement of the content on the virtual sheet of paper.

22. The method of claim 20, further comprising transmitting the content to an external device.

23. The method of claim 20, further comprising:

displaying a plurality of thumbnails on a region of the touch screen; and changing a printing order of content corresponding to the plurality of thumbnails according to another touch input on the region of the touch screen where the plurality of thumbnails are displayed.

24. A mobile device comprising:

a touch screen to display a virtual sheet of paper and at least one thumbnail; and a hardware processor programmed to control the touch screen to display content corresponding to the at least one thumbnail by arranging the content on the virtual sheet of paper according to a touch input on the virtual sheet of paper and the at least one thumbnail, determine a printing option based on the touch input on the virtual sheet of paper, and select an image, which corresponds to the at least one thumbnail of the single touch input, to be displayed as a preview image on the virtual sheet of paper based on the touch input, control the touch screen to display the preview image, on which the determined printing option is applied, and control the touch screen to display a mask image indicating the determined printing option on the at least one thumbnail, which corresponds to the preview image displayed on the virtual sheet of paper, based on the touch input on the virtual sheet of paper.

* * * * *